Figure 1:
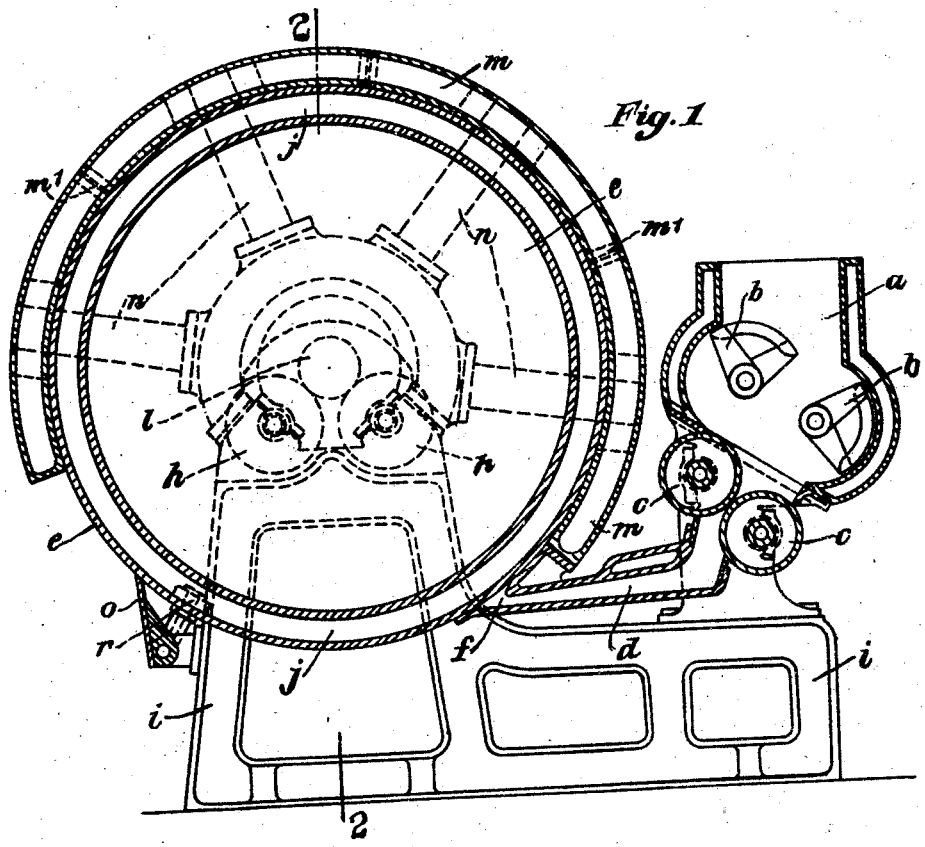

W. E. PRESCOTT.
APPARATUS FOR HEATING OR COOLING CHOCOLATE AND OTHER PLASTIC MATERIALS.
APPLICATION FILED SEPT. 27, 1919.

1,408,827.

Patented Mar. 7, 1922.
2 SHEETS—SHEET 1.

Inventor:
William Edward Prescott.
Attorney:

W. E. PRESCOTT.
APPARATUS FOR HEATING OR COOLING CHOCOLATE AND OTHER PLASTIC MATERIALS.
APPLICATION FILED SEPT. 27, 1919.

1,408,827.

Patented Mar. 7, 1922.
2 SHEETS—SHEET 2.

Inventor:
William Edward Prescott
Attorney:

UNITED STATES PATENT OFFICE.

WILLIAM EDWARD PRESCOTT, OF HARLESDEN, LONDON, ENGLAND, ASSIGNOR TO JOSEPH BAKER & SONS, LIMITED, OF LONDON, ENGLAND.

APPARATUS FOR HEATING OR COOLING CHOCOLATE AND OTHER PLASTIC MATERIALS.

1,408,827.

Specification of Letters Patent.   Patented Mar. 7, 1922.

Application filed September 27, 1919. Serial No. 326,931.

*To all whom it may concern:*

Be it known that I, WILLIAM EDWARD PRESCOTT, engineer, a subject of the King of England, residing at 29 St. Albans Road, Harlesden, London, England, have invented certain new and useful Improvements in Apparatus for Heating or Cooling Chocolate and other Plastic Materials, of which the following is a specification.

This invention relates to the heating or cooling of plastic materials, more especially chocolate, which it is desired to treat, particularly to cool or temper, and relates to improvements in that class of apparatus in which the material under treatment is passed in plastic condition about the surface or periphery of a grooved drum which is supplied interiorly with a cooling or heating medium and to part of the exterior of which, if desired, further cooling or heating means may also be applied, the treated material being removed from the drum by means of one or more scrapers or other devices.

The object of the present invention is to provide an apparatus adapted to more efficiently treat the material than hitherto and the invention consists primarily in forming the grooves in the drum periphery of relatively considerable depth and cross sectional area and of a wavy, undulating or zigzag contour, the grooves being also parallel and appropriately placed very close to one another.

The drum grooves of the present invention are distinct from those of known devices of shallow depth, either parallel or spiral and which produce merely a roughened surface for holding the material under treatment on the drum, since in this invention each groove forms a distinct chamber of considerable capacity for reception of the material and is exteriorly closed for the greater part of the circumference of the drum by an exterior chamber for receiving a heating or cooling medium which bears on the periphery of the drum and causes said medium to more effectively temper the material.

The material under treatment does not extend beyond the peripheral edge of the drum but is held in the grooves by the exterior chamber mentioned.

The invention also comprises a novel form of scraper for removing the material from the drum after treatment, this scraper receiving movements in accordance with the contour of the grooves.

Figure 2:
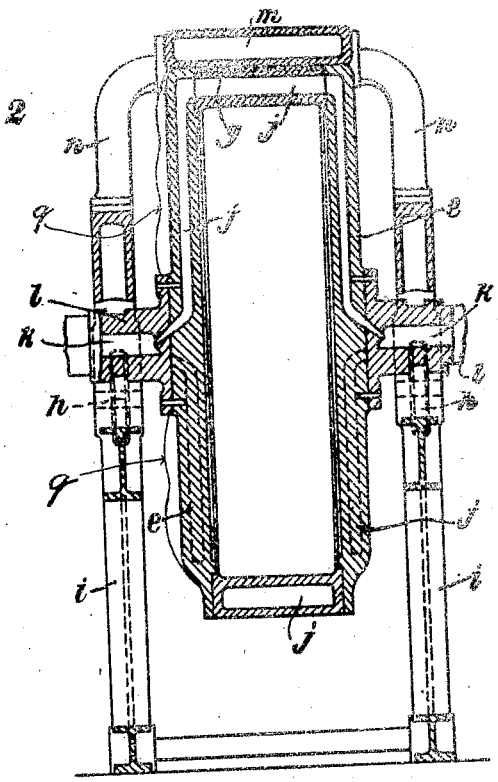
Figure 3:
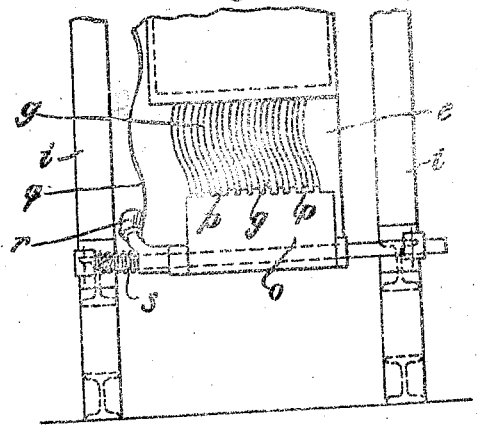

A practical embodiment of the invention is illustrated in the accompanying drawings, in which Fig. 1 is a sectional side elevation of the complete apparatus. Fig. 2 is a vertical section on the line 2—2 of Fig. 1. Fig. 3 is a partial end elevation from the left of Fig. 1, and Fig. 4 is a sectional detail view.

The material hereinafter referred to as chocolate, is fed from a jacketed mixing trough or apparatus $a$ provided with mixing blades $b$ through a pair of feed rollers $c$ which may be replaced by other appropriate devices to a conduit $d$ through which it is forced under pressure on to the periphery of the drum $e$, the said conduit $d$ adjacent the drum being suitably flared or enlarged as at $f$ in order to present a substantial cross-section to the drum periphery so that a relatively large amount of chocolate may be fed thereto under sufficient pressure to fill grooves provided in the surface of the drum.

The drum is shown as mounted on roller bearings $h$ carried by the framing $i$ and as is common in this form of apparatus, is supplied interiorly with a cooling or heating medium such as water or cold air by any convenient means shown as consisting of channels $j$ in the walls and periphery of the drum communicating with other channels $k$ in the hollow trunnions $l$. The primary and essential feature of the invention, however, lies in providing the periphery of the drum with a plurality of parallel relatively deep grooves $g$ of wavy or undulating contour as shown in Fig. 3, or of zigzag or similar contour extending completely round the drum and separated from each other by as small a space as possible, as shown at $g^1$, Fig. 4, the chocolate being fed into said grooves from the conduit $d$ and completely across the periphery of the drum in a layer or film.

Figure 4:
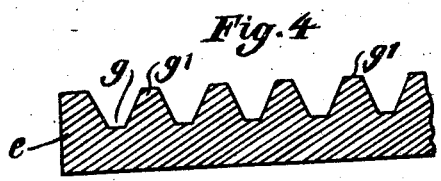

The cross-section of the grooves may be substantially triangular as in Fig. 4, or semi-circular, or such as to present as large surface of material to the action of the heating or cooling medium as possible, this medium being applied exteriorly by provision of a closed trunk or chamber extending partially round the drum for conveyance of the medium to act upon with the chocolate, and where such means are provided a preferred form comprises a closed chamber $m$ extending for the desired distance around the drum and containing cold air or adapted for circulation of cold water, and provided with transverse baffles $m^1$ to assist the zig-zag passage of the fluid, this chamber on its inner surface being in direct contact with the periphery of the drum, thus closing the grooves $g$ over the whole width of the drum to assist the cooling or heating action and serving to retain the chocolate in the grooves. The said chamber is shown as supported by means of arms $n$ at each side extending from the framing $i$.

At a suitable point in the periphery of the drum according to the length of treatment which the chocolate requires thereon, the removing means are provided shown as in the form of a scraper $o$ comprising a plurality of fingers $p$ of comb-like formation, each finger adapted to enter a groove $g$ of the drum and by preference being shaped to fit the cross-section of the grooves as indicated in Fig. 3. Owing to the particular contour given to said grooves it is desirable that the scraper should receive endwise or lateral movements in order to always follow said contour and this may be effected by providing the drum with a cam or guide path $q$ of a similar contour to that of the grooves and against which a roller $r$ carried by the scraper will bear under the action of a spring $s$ to receive the required movements.

What I claim as my invention and desire to secure by Letters Patent of the United States is:—

1. Apparatus for heating or cooling plastic materials comprising a drum on which the material is treated and having peripheral grooves of relatively considerable depth and cross sectional area and of a contour other than straight, said grooves presenting a large surface area for the action of the temperature changing fluid, and a closed chamber adapted to receive the desired temperature changing fluid, extending partially around the drum in close contact therewith and closing the grooves over the whole width of the drum.

2. Apparatus for heating or cooling plastic materials comprising a drum on which the material is treated and having peripheral grooves of relatively considerable depth and cross sectional area and of a contour other than straight, said grooves presenting a large surface area for the action of the temperature changing fluid, a closed chamber adapted to receive the desired temperature changing fluid, extending partially around the drum in close contact therewith and closing the grooves over the whole width of the drum, a scraper adapted to remove the treated material from the grooves of the drum, a series of fingers on said scraper adapted to enter said grooves and means for imparting to said scraper endwise or lateral movements corresponding to the contour of the grooves.

In witness whereof I have signed this specification.

WILLIAM EDWARD PRESCOTT.